(12) United States Patent
Gurvich et al.

(10) Patent No.: US 11,795,993 B2
(45) Date of Patent: Oct. 24, 2023

(54) BUCKLING RESISTANT COMPOSITE SHAFT AND METHOD OF MAKING A BUCKLING RESISTANT COMPOSITE SHAFT

(71) Applicant: Hamilton Sundstrand Corporation, Charlotte, NC (US)

(72) Inventors: Mark R. Gurvich, Middletown, CT (US); Georgios S. Zafiris, Glastonbury, CT (US); Brayton Reed, New York Mills, NY (US); Joyel M. Schaefer, Earlville, NY (US); Michael King, Sauquoit, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 301 days.

(21) Appl. No.: 17/209,540

(22) Filed: Mar. 23, 2021

(65) Prior Publication Data

US 2022/0307545 A1 Sep. 29, 2022

(51) Int. Cl.
  *F16C 3/02* (2006.01)
(52) U.S. Cl.
  CPC .......... *F16C 3/026* (2013.01); *F16C 2208/02* (2013.01); *F16C 2208/20* (2013.01); *F16C 2220/00* (2013.01)
(58) Field of Classification Search
  CPC .. F16C 3/026; F16C 2208/02; F16C 2208/20; F16C 2220/00
  USPC .................................................. 464/181, 183
  See application file for complete search history.

(56) References Cited

U.S. PATENT DOCUMENTS

| | | | |
|---|---|---|---|
| 3,052,107 A * | 9/1962 | Kempf | F16F 15/10 464/181 |
| 3,813,837 A * | 6/1974 | McClain | E04C 3/36 52/843 |
| 4,817,672 A | 4/1989 | Broodman | |
| 4,844,193 A | 7/1989 | Veselica et al. | |
| 6,851,247 B1 * | 2/2005 | Turner | E04H 12/02 |
| 6,918,839 B2 | 7/2005 | Holemans et al. | |

(Continued)

FOREIGN PATENT DOCUMENTS

| | | | | |
|---|---|---|---|---|
| DE | 681 109 | * | 9/1939 | .................... 464/183 |
| EP | 0356844 A2 | | 3/1990 | |

(Continued)

OTHER PUBLICATIONS

Extended European Search Report for European Application No. 22155254.0; Report dated Jul. 11, 2022 (pp. 1-8).

(Continued)

*Primary Examiner* — Greg Binda
(74) *Attorney, Agent, or Firm* — CANTOR COLBURN LLP (57) ABSTRACT

A composite shaft includes a shaft body formed from a plurality of polymer impregnated fiber-reinforced material layers having an annular outer surface and an annular inner surface defining a passage. A plurality of internal support members extend along the passage. Each of the plurality of internal support members includes a support body formed from molded plastic having an outer surface that abuts the annular inner surface of the support body, a first end, an opposing second end, and a circular end wall arranged at one of the first end and the opposing second end.

12 Claims, 9 Drawing Sheets

(56) References Cited

U.S. PATENT DOCUMENTS

| | | | |
|---|---|---|---|
| 6,986,713 B2 | 1/2006 | Dine et al. | |
| 7,111,436 B2 * | 9/2006 | Saiz | A62B 1/20 |
| | | | 52/843 |
| 9,975,376 B2 | 5/2018 | Rook | |
| 10,487,869 B2 | 11/2019 | Beale | |
| 2004/0000456 A1 | 1/2004 | Koleda | |
| 2007/0099713 A1 | 5/2007 | Campbell et al. | |
| 2017/0241471 A1 | 8/2017 | Murrish et al. | |
| 2020/0309186 A1 | 10/2020 | Gurvich et al. | |

FOREIGN PATENT DOCUMENTS

| | | |
|---|---|---|
| GB | 2215008 A | 9/1989 |
| WO | 9609159 A1 | 3/1996 |
| WO | 2005105417 A1 | 11/2005 |

OTHER PUBLICATIONS

European Application No. 22155254.0 filed Feb. 4, 2022; European Office Action dated Jun. 22, 2023; 6 pages.

* cited by examiner

BUCKLING RESISTANT COMPOSITE SHAFT AND METHOD OF MAKING A BUCKLING RESISTANT COMPOSITE SHAFT

BACKGROUND

Exemplary embodiments pertain to the art of composite shafts for aircraft and, more particularly, to a composite shaft and a method of making a composite shaft that efficiently resists risks of buckling.

Composite materials exhibit significant weight efficiency with respect to strength and stiffness properties in comparison with more conventional metals and alloys. Thus, composite materials are extremely attractive for numerous aircraft structures, including drive shafts. Drive shafts usually represent straight structural elements with a cylindrical hollow shape having constant or variable circular cross-section. Composite shafts are typically formed by polymer-matrix fiber-reinforced materials fabricated about a mandrel. The polymer and fiber material combine to form a wall thickness of the shaft that drives one or more strength and stiffness properties needed to satisfy design criteria such as structural integrity. The thicker the wall, the more resistant the shaft is to applied loads. However, additional wall thickness also contributes to increased weight and cost. Therefore, there is a need to design and fabricate composite drive shafts with relatively thin walls and correspondingly lower weight, but at the same time, reliable enough to sustain service conditions.

Torque is usually a dominant load component for drive shafts, although some bending and axial load components can also be considered. Therefore, torque-specific potential failure mechanisms should be considered as additional design criteria for composite shafts. One such potential failure mechanism under torque is buckling, i.e., conditions where the shape and/or geometry of the shaft are disproportionally deformed. Buckling is an indicator of unstable load transfer. Corresponding large deformations during buckling are reflected in higher stresses leading to premature shaft damage. Risk of buckling under torque is of greater concern in composite shaft design. That is, in a composite shaft reinforced fiber strength allows for shaft design to include relatively thin walls while maintaining axial loading load properties. However, the thin walls may not possess a desired buckling resistance. Therefore, the industry would welcome a composite shaft design that possesses both a thin wall and also resists buckling.

BRIEF DESCRIPTION

Disclosed is a composite shaft including a shaft body formed from a plurality of polymer impregnated fiber-reinforced material layers having an annular outer surface and an annular inner surface defining a passage. A plurality of internal support members extend along the passage. Each of the plurality of internal support members includes a support body formed from molded plastic having an outer surface that abuts the annular inner surface of the support body, a first end, an opposing second end, and a circular end wall arranged at one of the first end and the opposing second end.

Additionally, or alternatively, in this or other non-limiting examples, the plurality of internal support members includes a first internal support member and a second internal support member, the first internal support member abutting the second internal support member in the passage.

Additionally, or alternatively, in this or other non-limiting examples, two or more of the internal support members are joined together.

Additionally, or alternatively, in this or other non-limiting examples, wherein the circular end wall of the first internal support member includes a first opening and the circular end wall of the second internal support member includes a second opening that aligns with the first opening.

Additionally, or alternatively, in this or other non-limiting examples, a rod extending through the first opening and the second opening, the rod joining the first internal support member and the second internal support member.

Additionally, or alternatively, in this or other non-limiting examples, the first internal support member includes a first circular end wall at the first end and a second circular end wall at the opposing second end, and the second internal support member includes a first circular end wall portion at the first end and a second circular end wall portion at the opposing second end.

Additionally, or alternatively, in this or other non-limiting examples, the first internal support member includes a first length defined between the first circular end wall and the second circular end wall and the second internal support member includes a second length defined between the first circular end wall portion and the second circular end wall portion, the second length being distinct from the first length.

Additionally, or alternatively, in this or other non-limiting examples, the second circular end wall includes an axially inwardly extending portion that extends inward from the second end and the first circular end wall portion includes an axially outwardly extending portion that extends outwardly of the first end and nests within the axially inwardly extending portion.

Additionally, or alternatively, in this or other non-limiting examples, the annular outer surface of the shaft body includes a radially outwardly extending projection and the annular inner surface of the shaft body includes a pocket defined by the radially outwardly extending projection.

Additionally, or alternatively, in this or other non-limiting examples, the support body of the internal support member includes a radially outwardly projecting portion extending into the pocket, the radially outwardly projecting portion being defined by the outer surface.

Additionally, or alternatively, in this or other non-limiting examples, one of the first and the second circular end walls is formed by a plurality of ribs that radiate outwardly from a central hub to the inner surface.

Additionally, or alternatively, in this or other non-limiting examples, the one of the first and second circular end walls includes a circumferentially extending rib that extends about and is spaced from the central hub.

Also disclosed is a method of making a composite shaft. The method includes forming an internal support member having an outer surface, an annular inner surface, and a circular end wall by expanding an amount of thermoplastic material in an internal support member mold, removing the internal support member from the internal support member mold, providing the internal support member in a passage of the composite shaft with the outer surface abutting the annular inner surface of the composite shaft, and providing additional internal support members in the passage with one or more of the additional internal support members abutting the internal support member.

Additionally, or alternatively, in this or other non-limiting examples, the method may also include forming the internal support member and the additional internal support members into a mandrel, and forming the composite shaft around the mandrel.

Additionally, or alternatively, in this or other non-limiting examples, the method may also include joining the internal support member with the additional internal support members in the passage.

Additionally, or alternatively, in this or other non-limiting examples joining the internal support member with the additional internal support members includes positioning an axially outwardly extending portion on the internal support member into an axially inwardly extending portion formed in one of the additional internal support members.

Additionally, or alternatively, in this or other non-limiting examples, joining the internal support member with the additional internal support members includes passing a rod through the internal support member and the additional internal support members.

Additionally, or alternatively, in this or other non-limiting examples, the method may also include applying a compressive force to the internal support member and the additional internal support members through the rod.

Additionally, or alternatively, in this or other non-limiting examples, forming the internal support member includes forming the circular end wall with a plurality of ribs that extend outwardly from a hub to the annular inner surface.

Additionally, or alternatively, in this or other non-limiting examples, forming the internal support member includes forming the circular end wall with a plurality of ribs that extend outwardly from a hub to the annular inner surface and a circumferentially extending rib that extends about and spaced from the hub.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more non-limiting examples of the disclosed apparatus and method are presented herein by way of exemplification and not limitation with reference to the Figures.

Figure 1:
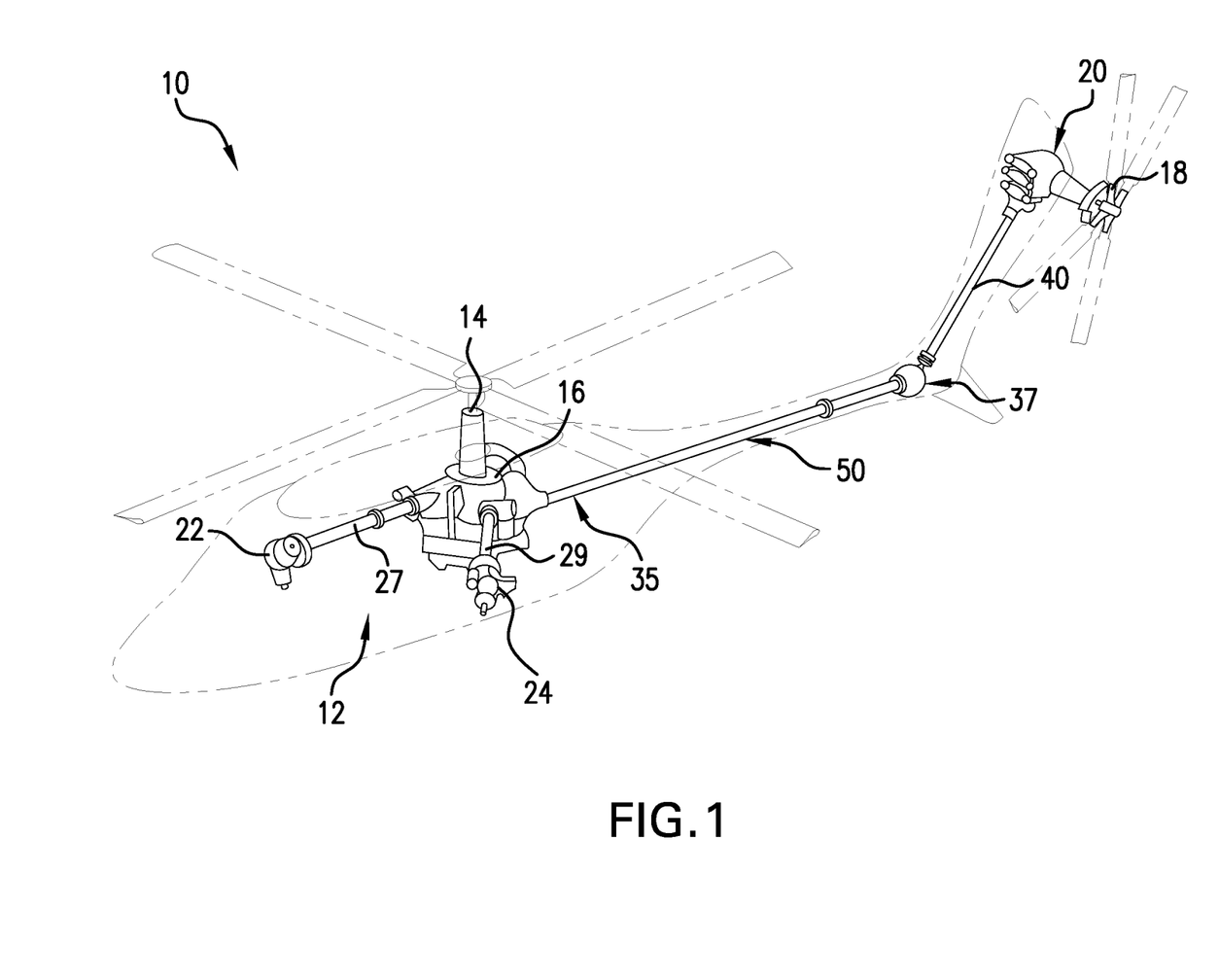
FIG. 1 depicts a glass view of a rotary wing aircraft including a composite drive shaft that resists buckling, in accordance with a non-limiting example.

With initial reference to FIG. 1, a rotary wing aircraft is indicated generally at 10. Rotary wing aircraft 10 includes a fuselage 12 that supports a main rotor assembly 14 having a main rotor gear box 16, and a tail rotor 18 having a tail rotor gear box 20. Rotary wing aircraft 10 can include a first engine 22 and a second engine 24. A first drive shaft system 27 extends between first engine 22 and a main rotor gear box 16. A second drive shaft system 29 extends between second engine 24 and main rotor gear box 16. A tail rotor drive shaft system 35, which may be made up from multiple tail rotor drive shaft sections (not separately labeled), extends between main rotor gear box 16 and an intermediate gear box 37. A pylon drive shaft system 40 extends between intermediate gear box 37 and tail rotor gear box 20.

Figure 2:
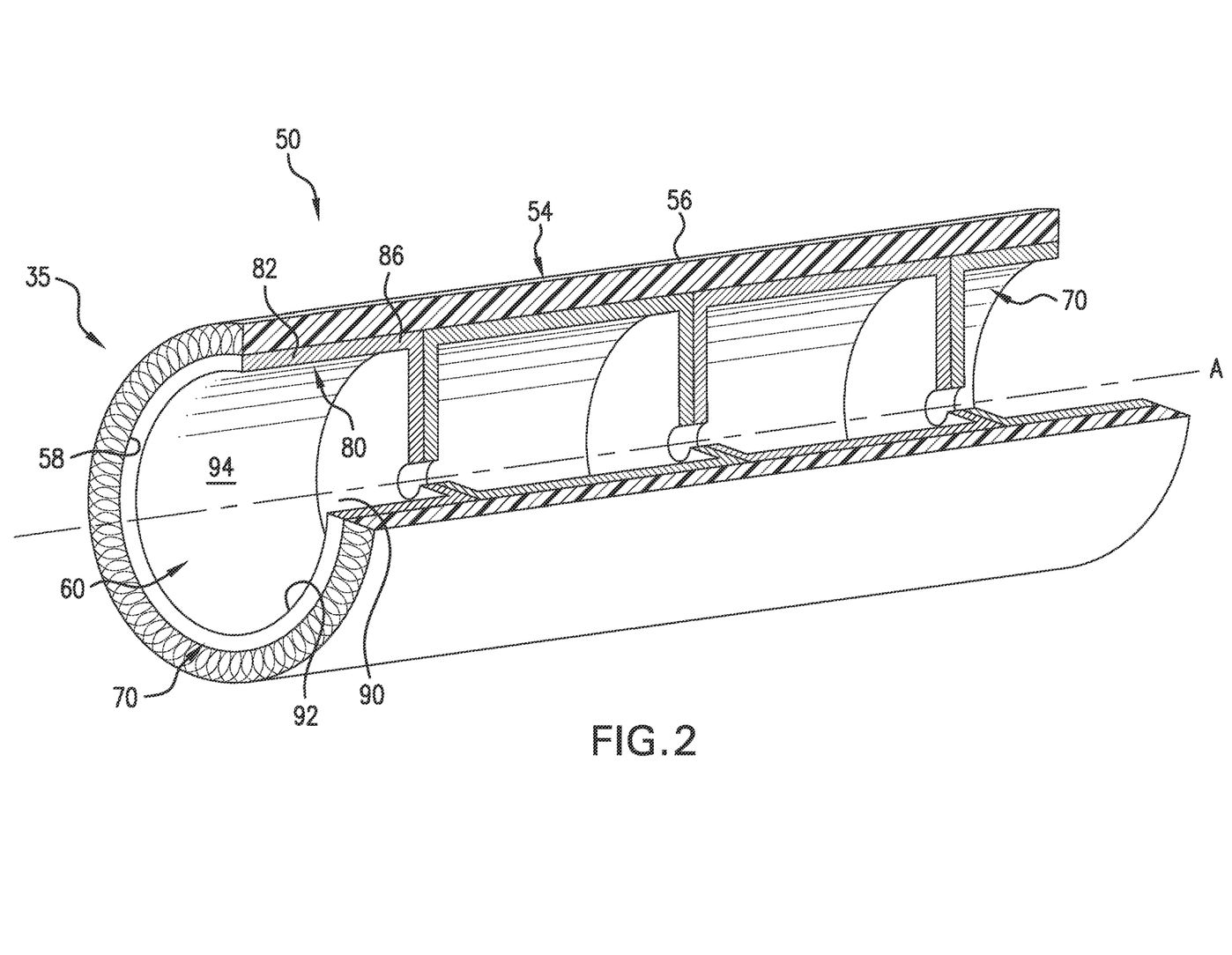
FIG. 2 depicts a partial perspective cross-sectional view of one of the composite shafts of FIG. 1 including internal support members, in accordance with a non-limiting example.

In a non-limiting example, tail rotor drive shaft system 35 takes the form of a composite shaft 50 made up from multiple fiber-reinforced polymer-matrix layers as shown in FIG. 2. At this point, it should be understood that while described in connection with a rotary wing aircraft, the composite shaft 50 described herein may also be employed in fixed wing aircraft as well as other applications that would benefit from enhanced buckling resistance.

As an example, composite shaft 50 may be made, for example, from carbon, glass, organic fibers, or any of their combinations. The polymer matrix of the composite shaft 50 can be either thermoplastic or thermoset. At this point, it should be understood that first drive shaft system 27, second drive shaft system 29, and pylon drive shaft system 40 may also take the form of composite shafts. With continued reference to FIG. 2, composite shaft 50 includes a shaft body 54 having an annular outer surface 56 and an annular inner surface 58 that defines a passage 60. In a non-limiting example, shaft body 54 may be formed from a plurality of polymer impregnated fiber-reinforced material layers (not separately labeled). A plurality of internal support members, one of which is indicated at 70, extend along passage 60.

Figure 3A:
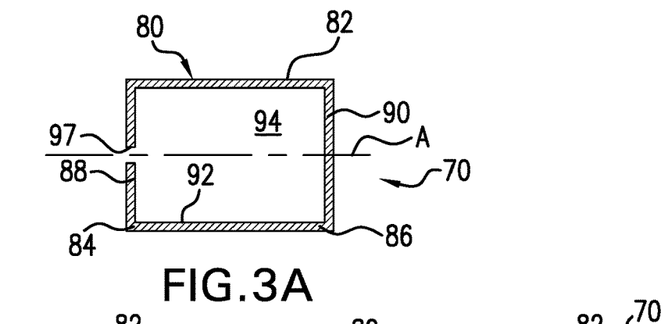
FIG. 3A depicts an axial cross-sectional view of internal support member in accordance with a non-limiting example.
Figure 3B:
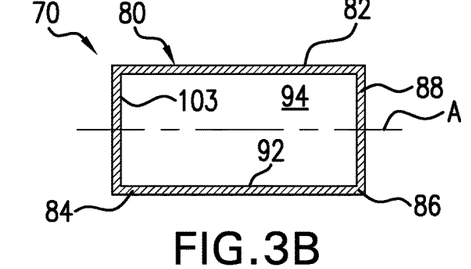
FIG. 3B depicts an axial cross-sectional view of internal support member in accordance with another non-limiting example.

Referring to FIG. 3A and with continued reference to FIG. 2, each internal support member 70 includes a support body 80 having an outer surface 82 that extends between a first end 84 and a second end 86. A first circular end wall 88 is arranged at first end 84 and a second circular end wall 90 is arranged at second end 86. Support body 80 further includes an inner surface 92 which defines a chamber 94 that is devoid of other materials, in accordance with an exemplary aspect. An opening 97 is provided in first circular end wall 88. Opening 97 may be a remnant of fabrication. That is, support body 80 is a unitary piece that is formed from, for example, gas-assisted or blow-molded thermoplastic. At this point, it should be understood that as used herein "unitary piece" as applied to an internal support member 70 describes an internal support member 70 with a support body 80 where outer surface 82, inner surface 92, first circular end wall 88 and second circular end wall 90 are formed from a single, continuous piece of material.

Figure 3C:
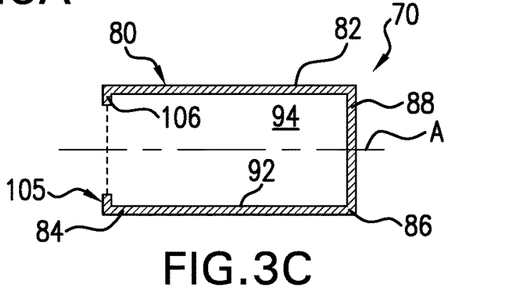
FIG. 3C depicts an axial cross-sectional view of internal support member in accordance with yet another non-limiting example.
Figure 3D:
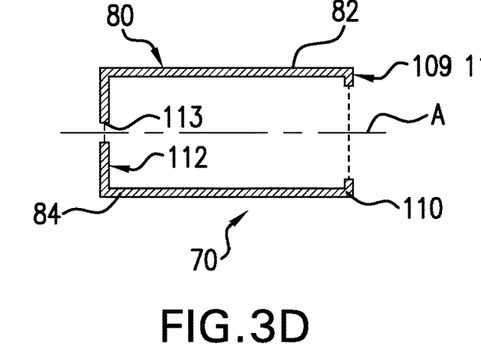
FIG. 3D depicts an axial cross-sectional view of internal support member in accordance with still yet another non-limiting example.
Figure 3E:
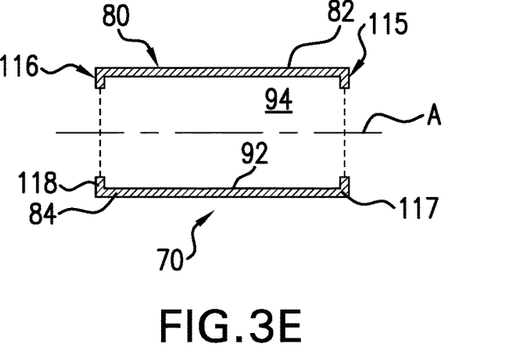
FIG. 3E depicts an axial cross-sectional view of internal support member in accordance with yet still another non-limiting example.
Figure 3F:
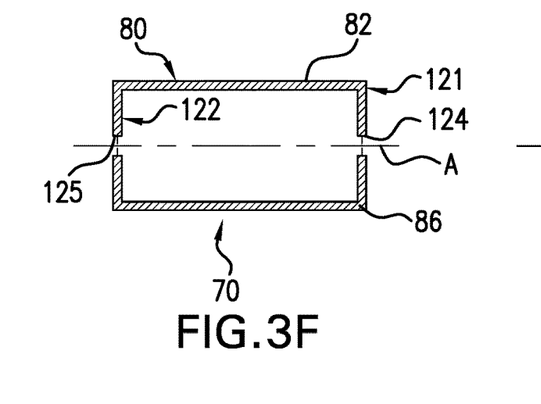
FIG. 3F depicts an axial cross-sectional view of internal support member in accordance with a further non-limiting example.

At this point, it should be understood that internal support members 70 may take on a variety of forms. Non-limiting examples are shown in FIGS. 3B-3G. For example, in FIG. 3B, support body 80 may include a first circular end wall 103 having a closed opening. In FIG. 3C, support body 80 includes a first circular end wall 105 with large opening that takes the form of a flange 106. In FIG. 3D, support body 80 includes a second circular end wall 109 with large opening in the form of a flange 110 and a first circular end wall 112 having a small opening 113 left over from, for example, fabrication. In FIG. 3E, support body 80 includes a second circular end wall 115 and a first circular end wall 116 each with large openings and in the form of a flange 117 and 118 respectively. In FIG. 3F, support body includes a second circular end wall 121 and a first circular end wall 122 each having a small opening 124 and 125 respectively that may be left after fabrication.

Figure 3G:
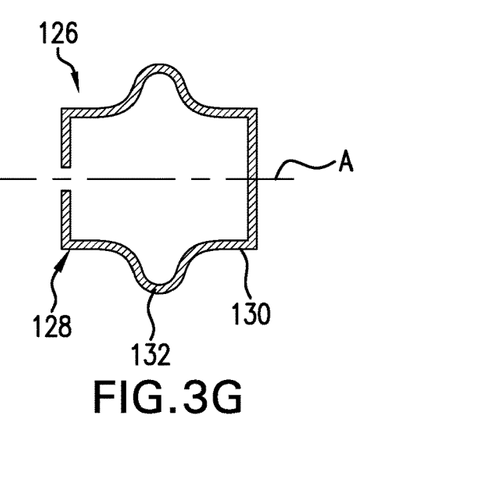
FIG. 3G depicts an axial cross-sectional view of internal support member in accordance with an additional non-limiting example.

In FIG. 3G, an internal support member 126 is shown to include a support body 128 having an outer surface 130 formed with an annular undulated shape, shown as rib 132. The undulated shape provides enhanced bending flexibility, without detracting from torsional stiffness. It should be understood that the number, size, and shape of ribs 132 may vary. When multiple ribs are employed, each rib may be similarly sized and shaped or may possess different sizes and/or shapes. Similarly, it should be understood that support members may vary in construction depending on specific design requirements and goals.

Figure 4:
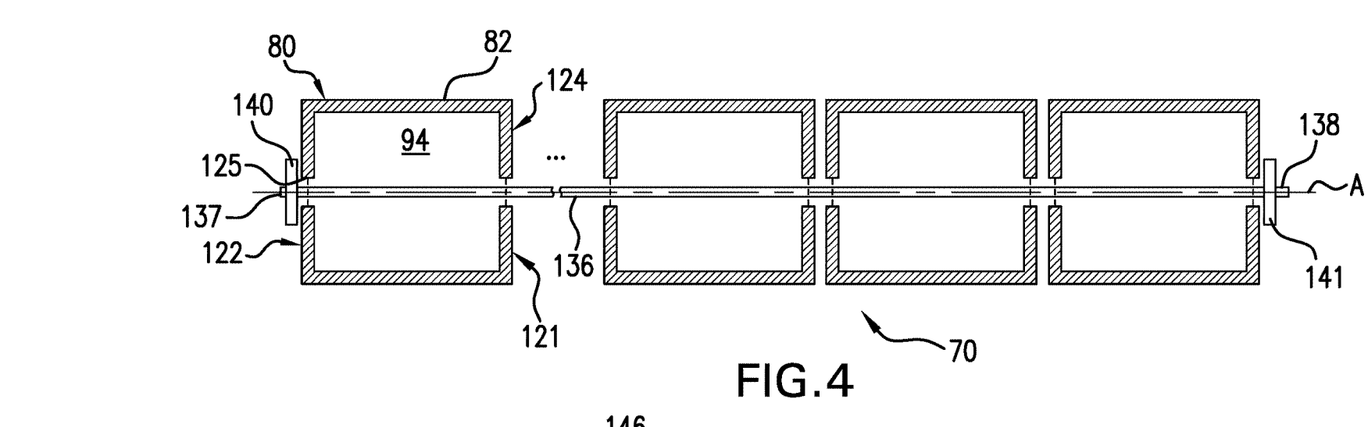
FIG. 4 depicts an axial cross-sectional view of plurality of internal support members of FIG. 3F joined through a rod.

Referring to FIG. 4, internal support members, such as those shown in FIG. 3F may be joined by a rod 136 having ends 137 and 138. Fasteners 140 and 141, or other structures, mounted to ends 137 and 138 may be manipulated, e.g., tightened, to apply a compressive force to the internal support members 70. Fasteners 140 and 141 can be mounted to ends 137 and 138 by various mechanisms including, for example, interlocking threads. The compressive force may establish a preload or may be utilized as a holding force as internal support members are connected and bonded together. Note that while FIG. 4 illustrates an arrangement of support members 70 such as shown in FIG. 3F, it should be understood that other support member configurations may be joined in a similar manner. It should also be appreciated that, in accordance with a non-limiting example, internal support members may be joined on to another by an adhesive, sonic welding, thermal welding or other systems that may be employed to join thermoplastic or joined together by axial pressure, provided, for example, by rod 136.

Figure 5:
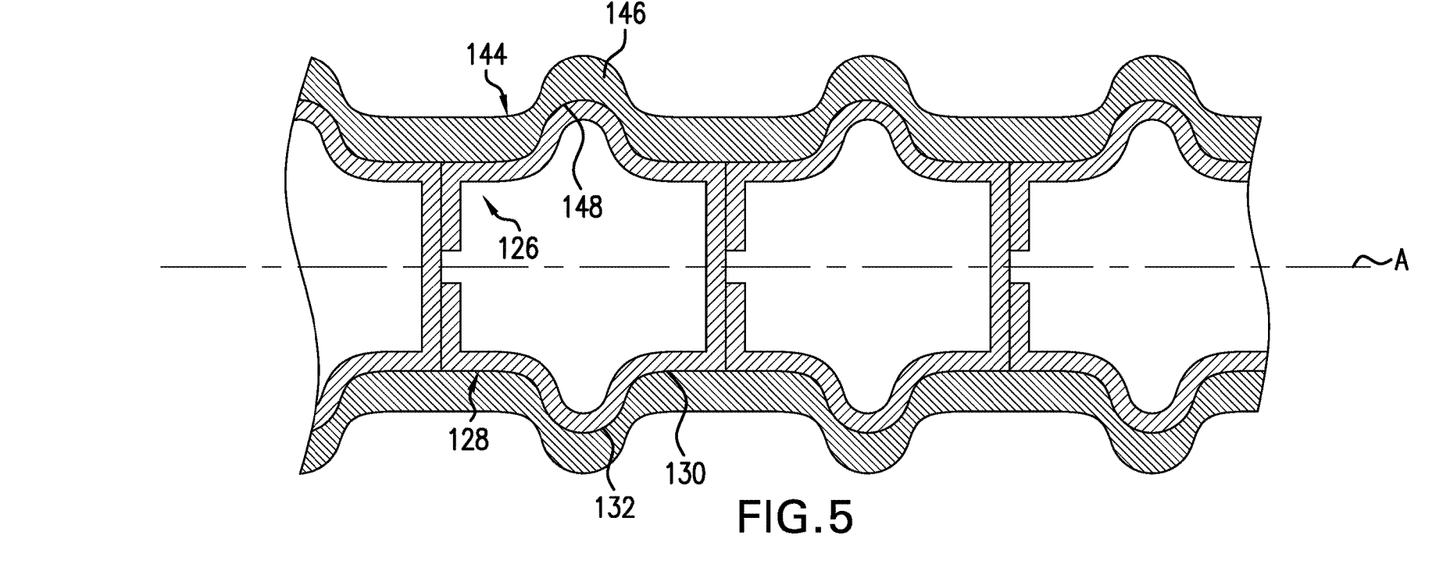
FIG. 5 depicts an axial cross-sectional view of plurality of internal support members of FIG. 3G arranged in a composite shaft.

In FIG. 5, internal support members 126 such as shown in FIG. 3G are aligned and a composite shaft 144 is formed about outer surface 130. Composite shaft 144 includes a number of radially outwardly extending annular projections 146 each of which forms a corresponding annular internal pocket 148 receptive of annular rib 132. The annular ribs 132 and projections 146 combine to enhance axial bending flexibility of composite shaft 144 as may be desired for various design configurations.

Figure 6A:
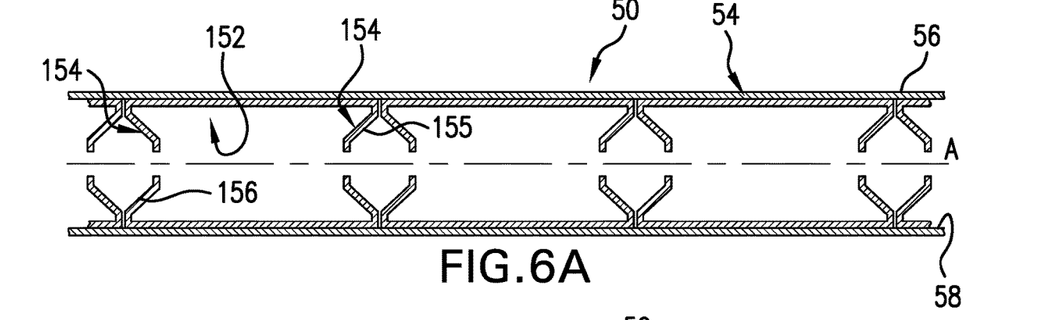
FIG. 6A depicts an axial cross-sectional view of composite shaft including a plurality of internal support members having a circular end wall geometry, in accordance with a non-limiting example.
Figure 6B:
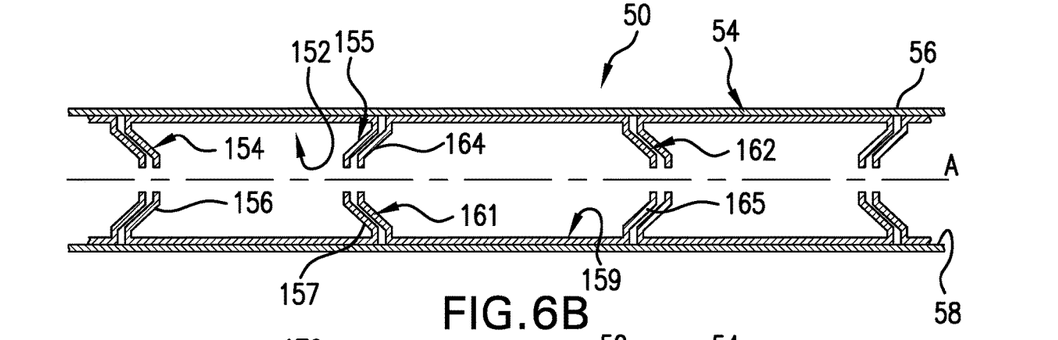
FIG. 6B depicts an axial cross-sectional view of composite shaft including a plurality of internal support members having a circular end wall geometry, in accordance with another non-limiting example.

FIGS. 6A-6D depict additional non-limiting examples of internal support members. In particular, internal support members having first and second circular end walls with different geometries. For example, in FIG. 6A, an internal support member 152 include a first circular end wall 154 and a second circular end wall 155 each having a corresponding axially inwardly extending portions 156 and 157. A chamber (not separately labeled) is defined between second circular end wall 155 and a first circular end wall of an abutting internal support member. In FIG. 6B, an internal support member 159 includes first and second circular end walls 161 and 162 each of which define corresponding first and second axially outwardly extending projections 164 and 165. Axially outwardly extending projections 164/165 extend along a central longitudinal axis "A" of composite shaft 50. In this arrangement, first axially outwardly extending projection 164 may nest within the axial inwardly extending projection 156 defined in, internal support member, 152.

Figure 6C:
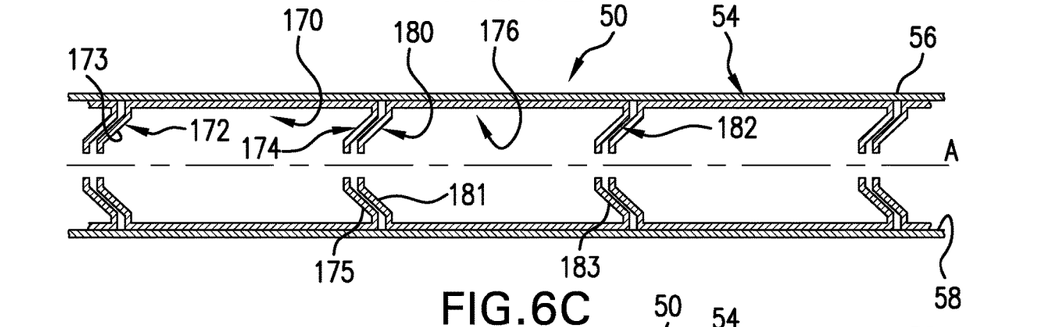
FIG. 6C depicts an axial cross-sectional view of composite shaft including a plurality of internal support members having a circular end wall geometry, in accordance with yet another non-limiting example.

In FIG. 6C, a first internal support member 170 is shown to include a first circular end wall 172 including an axially outwardly extending projection 173 and a second circular end wall 174 defining an axially inwardly extending projection 175. Axially outwardly extending projection 173 extends away from first internal support member 170 along central longitudinal axis "A' while axially inwardly extending projection 175 extends into first internal support member 170 along central longitudinal axis "A". A second internal support member 176 is similarly formed. For example, second internal support member 176 includes a first circular end wall portion 180 including an axially outwardly extending portion 181 and a second circular end wall portion 182 defining an axially inwardly extending projection 183. Axially outwardly extending projection 181 extends away, relative to second internal support member 176 along central longitudinal axis "A" while axially inwardly extending projection 183 extends into second internal support member 176 along central longitudinal axis "A".

Figure 6D:
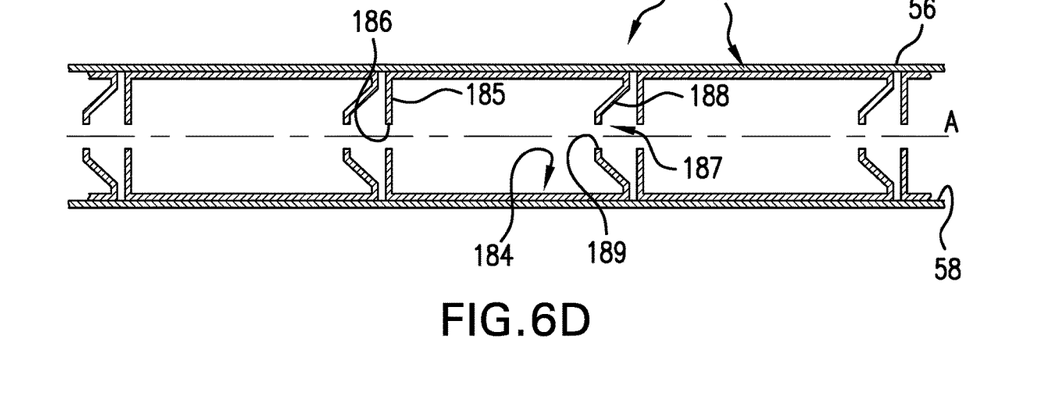
FIG. 6D depicts an axial cross-sectional view of composite shaft including a plurality of internal support members having a circular end wall geometry, in accordance with still yet another non-limiting example.

In FIG. 6D, an internal support member 184 is shown to include a first circular end wall 185 that may include an opening 186 and a second circular end wall 187 that includes an axially inwardly extending portion 188 which may include an opening 189. Axially extending inwardly extending portion 188 extends into internal support member 184 along central longitudinal axis "A". A chamber (not separately labeled) may be defined between second circular end wall 187 and a first circular end wall of an abutting internal support member. The various geometries may be interchanged and combined to establish various flexibility qualities of the associated composite shaft.

Figure 7A:
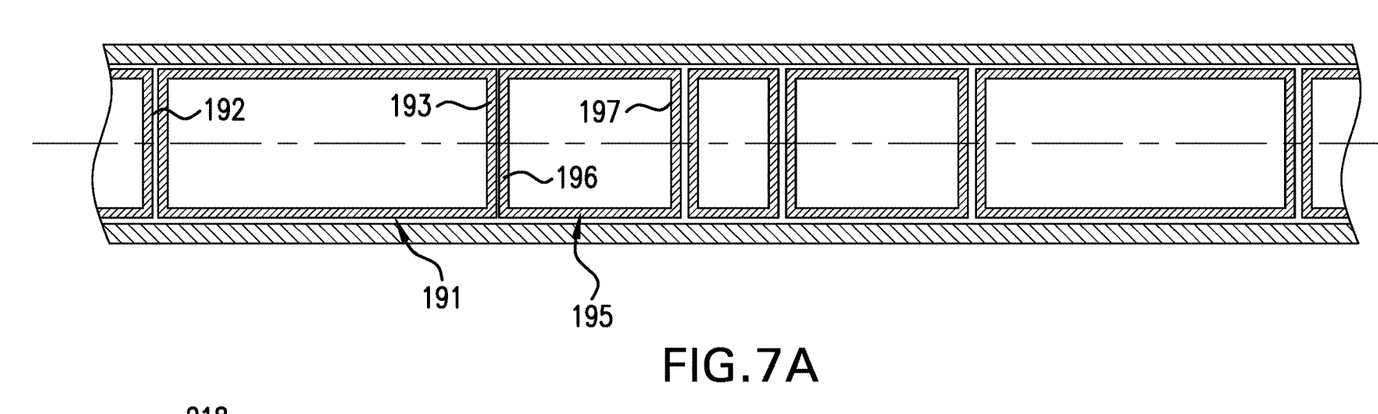
FIG. 7A depicts an axial cross-sectional view of composite shaft including a plurality of different sized internal support members, in accordance with another non-limiting example.
Figure 7B:
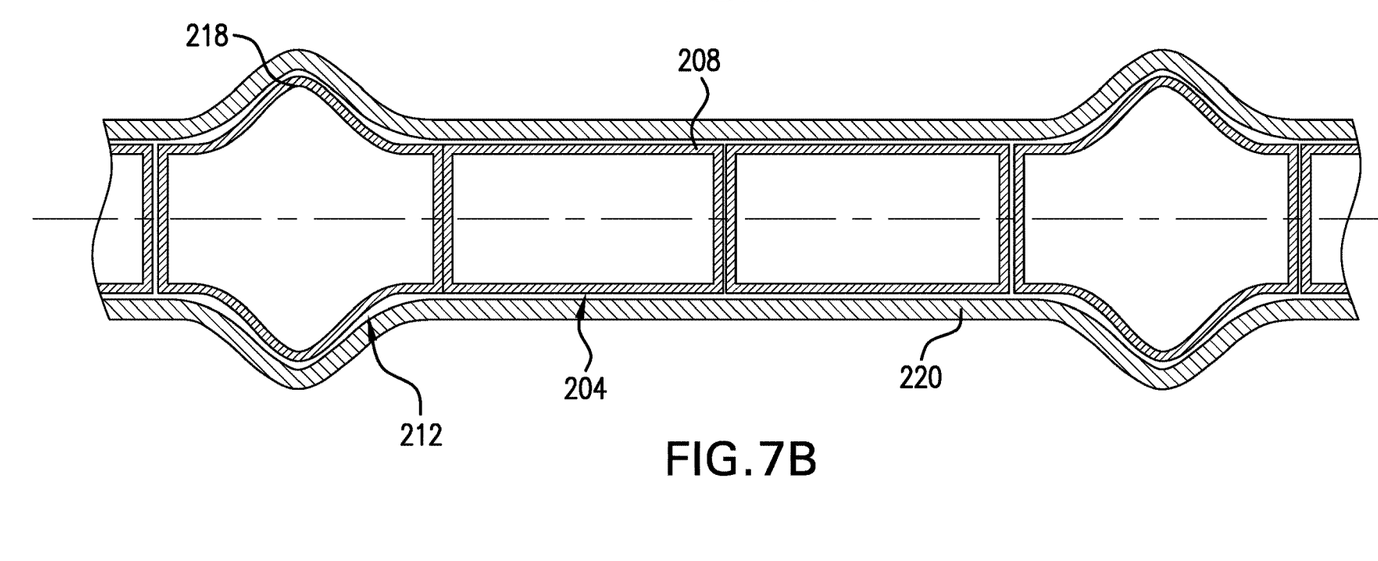
FIG. 7B depicts an axial cross-sectional view of composite shaft including a plurality of internal support members, in accordance with yet another non-limiting example.

Further, in FIG. 7A a first internal support member 191 is shown to include a first circular end wall 192 spaced from a second circular end wall 193 by a first length and a second internal support member 195 having a first circular end wall portion 196 spaced from a second circular end wall portion 197 by a second length that is distinct from the first length. Thus, it should be understood that internal support members of varying lengths may be combined to accommodate various lengths of composite shafts. Similarly, different internal support members can have different wall thicknesses or other geometrical characteristics, e.g., local curvatures. In FIG. 7B an internal support member 204 having an annular outer surface 208 may be combined with an internal support member 212 having an annular undulated rib 218 in a composite shaft 220. The number of, and spacing between support members may vary in order to achieve a selected flexibility characteristic and yet still withstand applied load conditions.

Figure 8A:
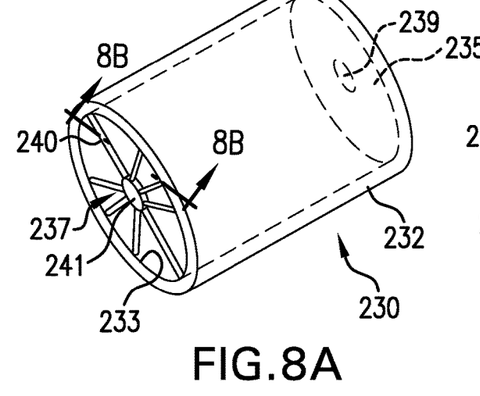
FIG. 8A depicts a perspective view of an internal support member having a circular end wall formed with a plurality of radially extending ribs, in accordance with a non-limiting example.
Figure 8B:
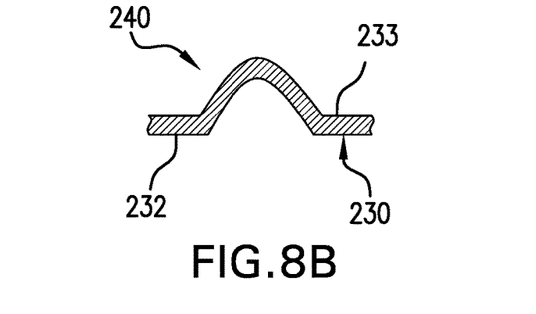
FIG. 8B depicts an axial cross-sectional view of one of the plurality of radially extending ribs taken through the line 8B-8B in FIG. 8A.

Reference will now follow to FIG. 8A in describing an internal support member 230 that may be incorporated into composite shaft 50 in accordance with another non-limiting example. Internal support member 230 includes an annular outer surface 232 and an inner surface 233. Internal support member 230 includes a first circular end wall 235 and a second circular end wall 237. First circular end wall 235 is substantially solid but for, in accordance with a non-limiting example, a central opening 239. Second circular end wall 237 is formed by a plurality of ribs, one of which is indicated at 240 that radiate outwardly from a central support 241 and connector with inner surface 233. Each rib 240 may generally have different cross-sectional shapes, such as a curvilinear cross-section shown in FIG. 8B in accordance with a non-limiting example. Ribs 240 increase the bending stiffness of second circular wall end 237 to thereby improve localized buckling resistance at second circular end wall 237 and potential local buckling of, for example, internal support member 230.

Figure 8C:
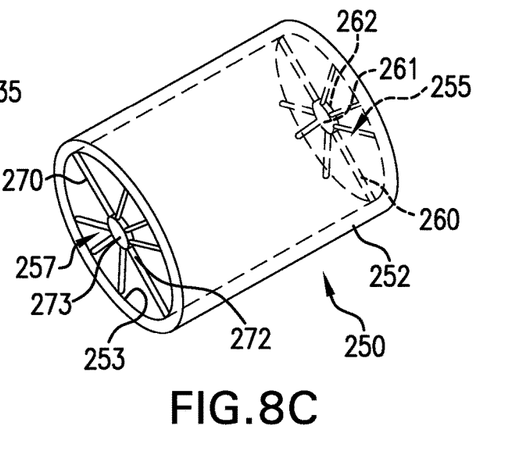
FIG. 8C depicts a perspective view of an internal support member having first and second circular end walls formed by a plurality of radially extending ribs, in accordance with a non-limiting example.
Figure 8D:
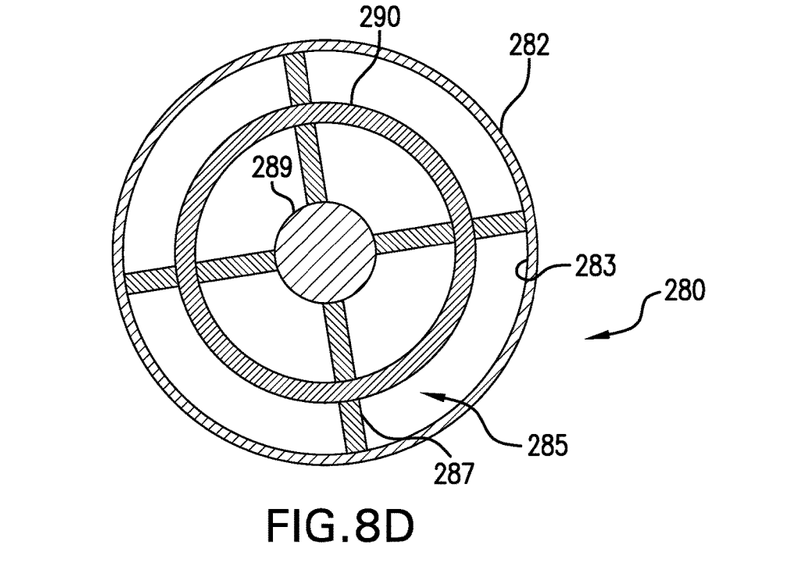
FIG. 8D depicts an axial end view of an internal support member having a circular end wall formed with a plurality of radially extending ribs and a circumferential rib, in accordance with a non-limiting example.

An internal support member 250 in accordance with another non-limiting example is shown in FIG. 8C. Internal support member 250 includes an annular outer surface 252 and an inner surface 253. Internal support member 250 also includes a first circular end wall 255 and a second circular end wall 257. First circular end wall 255 is formed from a plurality of ribs, one of which is indicated at 260, that radiate outwardly from a central hub 261 to inner surface 253. Central hub 261 may include an opening 262. Similarly, second circular end wall 257 formed by a plurality of ribs, one of which is indicated at 270 that radiate outwardly from a central hub 272 and connect with inner surface 253. Central hub 272 may include an opening 273. In a non-limiting example, ribs 260 and ribs 27 may have a generally flat cross section or possess a generally curvilinear cross-section. At this point, it should be understood that the number and arrangement of ribs may vary.

FIG. 8C depicts an internal support member 280 having an outer surface 282 and an inner surface 283. Internal support member 280 includes at least one circular end wall 285 formed by a plurality of ribs, one of which is indicated at 287 that project radially outwardly from a central hub 289 to inner surface 283. Circular end wall 285 also includes a circumferentially extending rib 290 that extends about, and is spaced from, central hub 289. Circumferentially extending rib 290 connects with each of the plurality of ribs 287. At this point, it should be understood that the number and arrangement of ribs may vary. Also, in addition to radial ribs 287 and circumferential ribs 290 other geometrical and topological designs of a plurality of ribs may be employed. Further, it should be appreciated that the ribs and central support provide desired stiffness and strength characteristics for a composite shaft.

Figure 9:
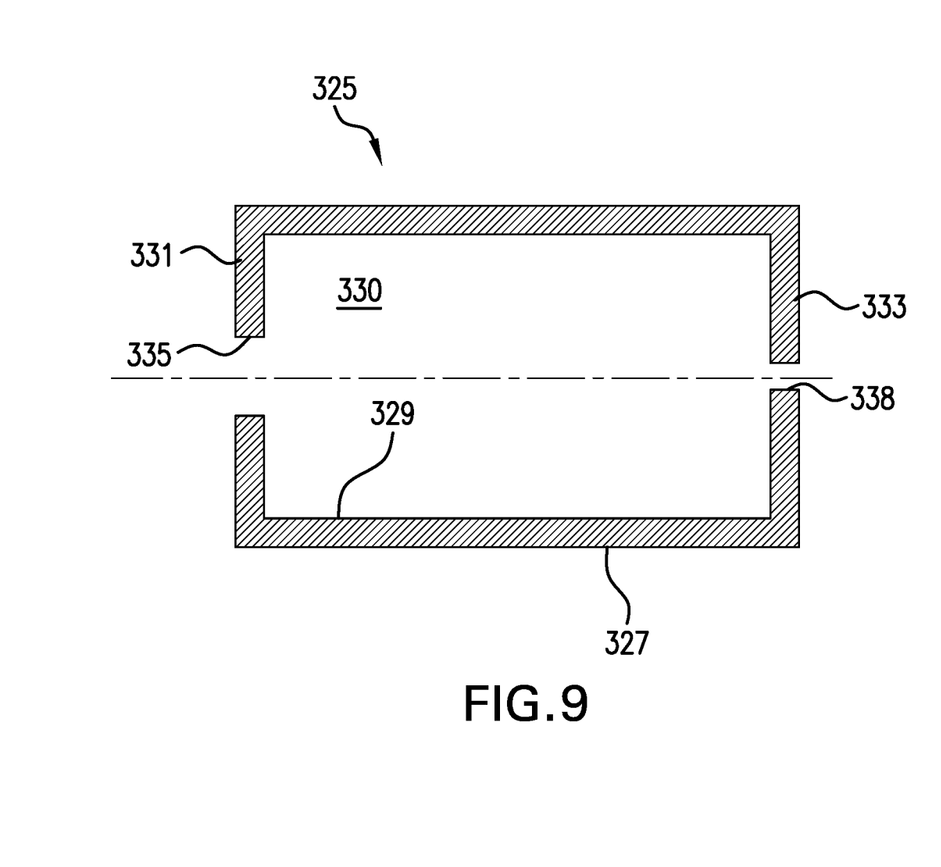
FIG. 9 depicts an axial cross-sectional side view of a mold for making internal support members, in accordance with a non-limiting example.
Figure 10:
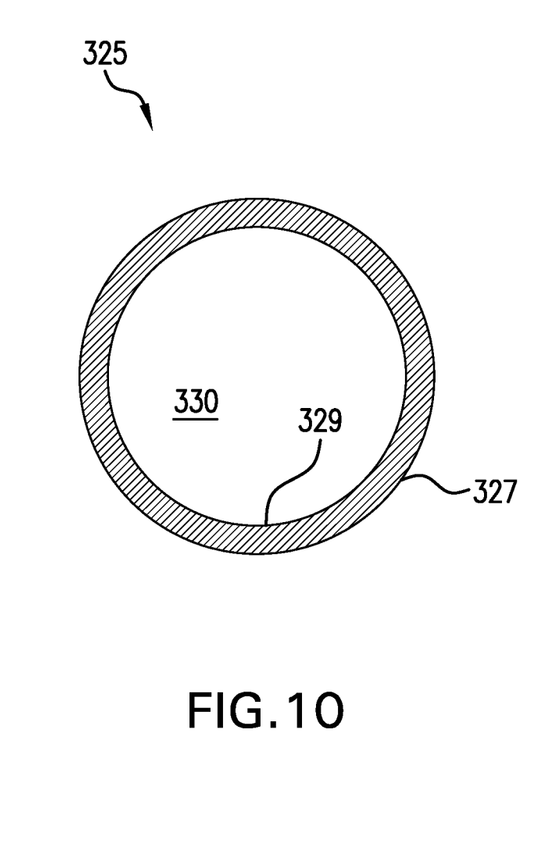
FIG. 10 depicts a diametric cross-sectional axial end view of the mold of FIG. 9, in accordance with a non-limiting example.
Figure 11:
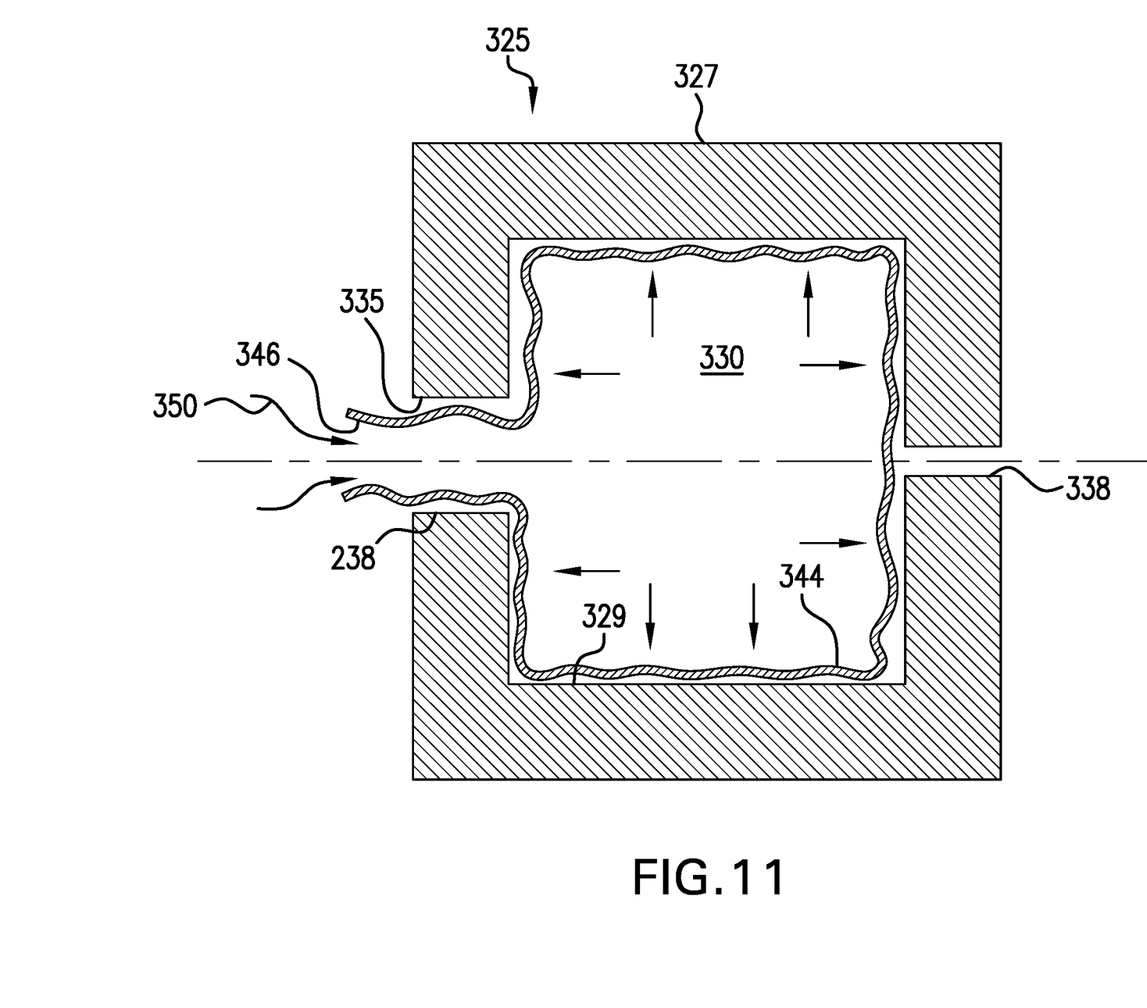
FIG. 11 depicts an axial cross-sectional view of an internal support member being formed in the mold of FIG. 9, in accordance with a non-limiting example.

Reference will now follow to FIGS. 9-11 in describing a method of fabricating an internal support member in accordance with a non-limiting example. An internal support member mold 325 includes an outer surface 327 and an inner surface 329 that defines a chamber 330. Internal support member mold 325 includes a first end wall 331 and a second end wall 333. First end wall 331 includes a first opening 335 and second end wall 333 can include an optional second opening 338. Such molds consists of several parts kept together during fabrication of an insert, but disjointed after the fabrication to remove a manufactured insert.

As shown in FIG. 11, an amount of thermoplastic in the form of a thermoplastic blank 344 having an inlet 346 is positioned in chamber 330. Inlet 346 is passed through first opening 335. Thermoplastic blank 344 is heated inside mold chamber 330 at or above a softening or melt temperature upon which an amount of a gas 350 is delivered through inlet 346 causing thermoplastic blank 344 to expand and take on a shape of chamber 330. As thermoplastic blank 344 expands and forms the internal support member shape, air in chamber 330 may escape through first opening 335 and/or second opening 338. Thermoplastic blank 344, now in the form of an internal support member, is cooled and removed from internal support member mold 325 for later incorporation into a composite shaft.

Methods of follow-up forming of composite shaft around a supporting member or a plurality of supporting members can be different and based on specifics of designs shafts, applied load conditions and other parameters, such as cost, availability of needed equipment, availability of trained manpower and suppliers, etc. Among such methods, the Automated Fiber Placing (AFP), filament wounding and braiding can be employed. When using internal support members without undulated ribs, wrapping of composite shaft can be employed as well.

At this point, it should be understood that the non-limiting examples presented herein describe a composite shaft that resists buckling forces. The composite shaft includes a series of internal support members that are designed to provide a resistance to buckling forces yet remain lightweight and flexible. Further the internal support members may be formed to include different geometries and sizes in order to meet particular reinforcement, weight, and flexibility requirements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A composite shaft comprising:
   a shaft body formed from a plurality of polymer impregnated fiber-reinforced material layers having an annular outer surface and an annular inner surface defining a passage; and
   a plurality of internal support members extending along the passage, each of the plurality of internal support members including a support body formed from molded plastic having a continuous outer surface that extends circumferentially about and abuts the annular inner surface of the support body, a first end, an opposing second end, and a circular end wall extending radially inwardly from the outer surface arranged at one of the first end and the opposing second end.

2. The composite shaft according to claim 1, wherein the plurality of internal support members includes a first internal support member and a second internal support member, the first internal support member abutting the second internal support member in the passage.

3. The composite shaft according to claim 2, wherein two or more of the internal support members are joined together.

4. The composite shaft according to claim 3, wherein the circular end wall of the first internal support member includes a first opening and the circular end wall of the second internal support member includes a second opening that aligns with the first opening.

5. The composite shaft according to claim 4, further comprising: a rod extending through the first opening and the second opening, the rod joining the first internal support member and the second internal support member.

6. The composite shaft according to claim 2, wherein the first internal support member includes a first circular end wall at the first end and a second circular end wall at the opposing second end, and the second internal support member includes a first circular end wall portion at the first end and a second circular end wall portion at the opposing second end.

7. The composite shaft according to claim 6, wherein the first internal support member includes a first length defined between the first circular end wall and the second circular end wall and the second internal support member includes a second length defined between the first circular end wall portion and the second circular end wall portion, the second length being distinct from the first length.

8. The composite shaft according to claim 6, wherein the second circular end wall includes an axially inwardly extending portion that extends inward from the second end and the first circular end wall portion includes an axially outwardly extending portion that extends outwardly of the first end and nests within the axially inwardly extending portion.

9. The composite shaft according to claim 1, wherein the annular outer surface of the shaft body includes a radially outwardly extending projection and the annular inner surface of the shaft body includes a pocket defined by the radially outwardly extending projection.

10. The composite shaft according to claim 9, wherein the support body of the internal support member includes a radially outwardly projecting portion extending into the pocket, the radially outwardly projecting portion being defined by the outer surface.

11. The composite shaft according to claim 1, wherein one of the first and the second circular end walls is formed by a plurality of ribs that radiate outwardly from a central hub to the inner surface.

12. The composite shaft according to claim 1, wherein the one of the first and second circular end walls includes a circumferentially extending rib that extends about and is spaced from the central hub.

* * * * *